2 Sheets—Sheet 1.

T. R. HUTTON.
Freight-Car.

No. 221,315. Patented Nov. 4, 1879.

WITNESSES
Henri Guillaume
Alf. L. Leonard

INVENTOR
Thomas R. Hutton
Henry Orth atty

2 Sheets—Sheet 2.

T. R. HUTTON.
Freight-Car.

No. 221,315. Patented Nov. 4, 1879.

WITNESSES
Henri Guillaume
Alf. L. Leonard

INVENTOR
Thomas R. Hutton
pr Henry Orth
atty

UNITED STATES PATENT OFFICE.

THOMAS R. HUTTON, OF BARROW IN FURNESS, COUNTY OF LANCASTER, ASSIGNOR TO EDWARD SATTERTHWAITE, OF SAME PLACE, AND WILLIAM SATTERTHWAITE, OF AMBLESIDE, ENGLAND.

IMPROVEMENT IN FREIGHT-CARS.

Specification forming part of Letters Patent No. 221,315, dated November 4, 1879; application filed September 26, 1879; patented in England, April 30, 1878.

*To all whom it may concern:*

Be it known that I, THOMAS ROBERTS HUTTON, of Barrow in Furness, in the county of Lancaster, England, merchant, have invented a new or Improved Freight-Wagon, for carrying minerals or grain in bulk, and mode of discharging same; and I do hereby declare that the following specification is an exact and clear description of same, for which invention I have obtained Letters Patent in England, bearing date the 30th April, 1878, No. 1,736.

This invention relates to improvements in that class of wagons used for carrying bulk cargo, and affords facilities for discharging said cargo through the bottom in an expeditious manner.

According to my invention the floor of the wagon is divided into two or more sections or parts, which form wings, and these wings are pivoted at or near their centers, so as to be free to rotate. The action of these pivoted wings when discharging cargo is such that the two adjacent edges of the wings will move downward until an opening or aperture is formed between the wings, through which the contents of the wagon may freely descend.

Levers or other suitable mechanism may be employed for moving the wings back into position, or they may be so moved back by hand. These said wings or sections rest on a suitably-shaped bar of metal or wood, arranged transversely in such a manner that upon the bar being turned the wings are free to pass the bar and open out, as above described; or a bar or bolt may support them, the withdrawal of which allows them to rotate.

Figure 1:
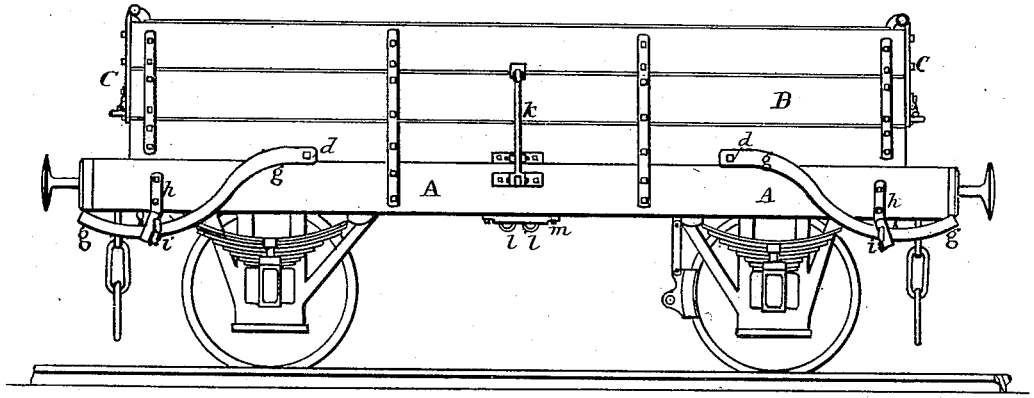
Figure 2:
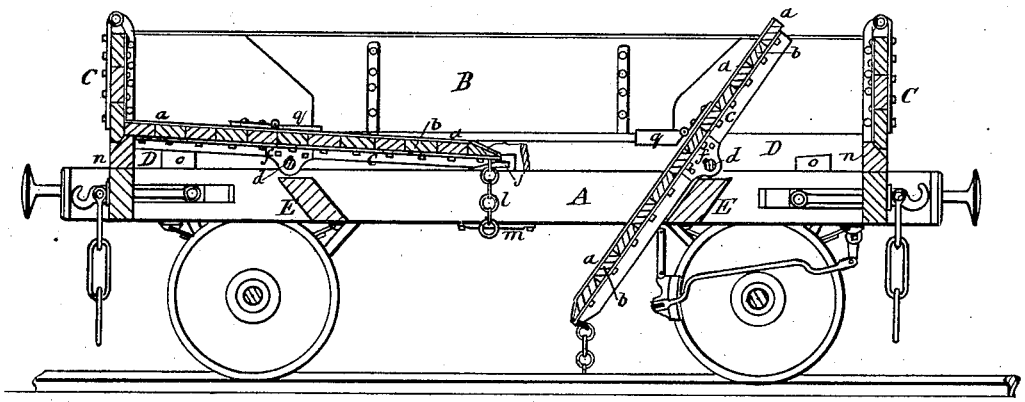
Figure 3:
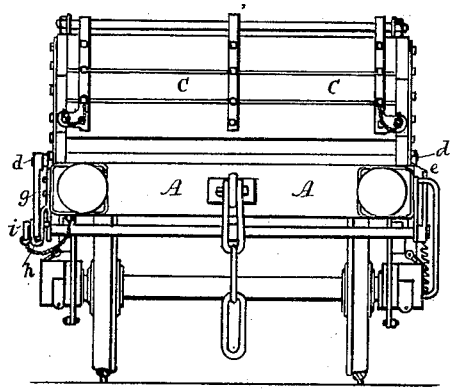
Figure 4:
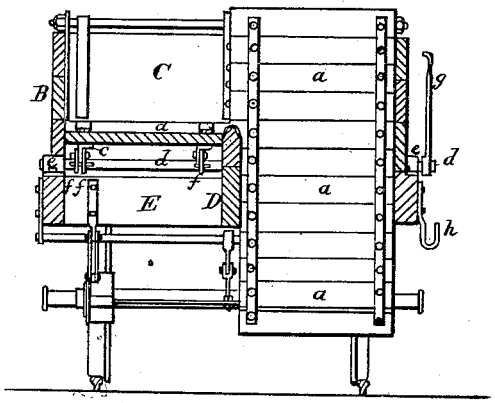

In the accompanying drawings, Figure 1 is a side elevation, and Fig. 3 an end elevation, of a common form of wagon constructed with pivoted wings according to my invention. Fig. 2 is a longitudinal vertical sectional view, showing one wing open and the other closed. Fig. 4 is a cross-sectional view, showing one half of a wing open and the other half closed.

A represents the sole of the wagon; B, the sides; C, the end doors; D, the middle longitudinal, running between the cross-bearers E, the latter being preferably in a diagonal position, as shown.

$a\ a$ are rotating wings, which may be formed of cross-timbers $b\ b$, supported upon and secured to angle T or other suitable section of irons $c\ c$, as shown. $d\ d$ are shafts, supported in the bearings $e$, fastened down by screw-bolts to the sole A of the wagon. $f\ f$ are plates keyed onto the shafts $d$, and secured to the angle-irons $c$ by screw-bolts, as shown. One or more additional bearings for the shafts $d$ may be arranged, as found convenient, between the two outer bearings.

In practice I prefer to place the shafts and bearings in such a position as to give a slight preponderance of weight to the inner side of the wings, so as to facilitate the operation of opening the wings and discharging cargo.

The wings, instead of being arranged in a slightly-sloping position, as shown, may be in a horizontal position; and that portion of the wings between the shafts or pivots may be made with steps or sunk so as to form a recess in the central portion of the wagon, thereby increasing its capacity.

In the drawings the wings are shown supported on shafts and bearings arranged below. They may, however, be suspended from pivots arranged above them.

India-rubber pads may be placed upon the cross-bearers E to receive the blow of the angle-irons $c$ as the wings $a$ descend when opening.

Figures 6, 7:
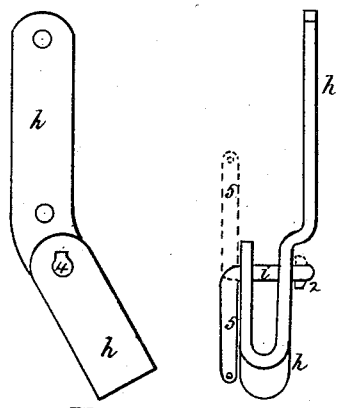

$g\ g$ are handles fastened upon the ends of the shafts $d$. The handles $g$, in addition to being useful for actuating the wings $a$, also assist in holding the wings in position by being locked each in a guard, $h$, by a pin, $i$. (Shown enlarged at Figs. 6 and 7.) The pin $i$ is formed with a notch, 2, at its lower side, a corresponding opening or slot being made at the upper side of the hole 4. The pin $i$ is turned upside down, in order that the notch 2 may enter and pass through the guard. The handle 5, upon being turned down, alters the position of the notch, so that the pin cannot be withdrawn until the notch be again brought in front of the slot or opening.

Figure 5:
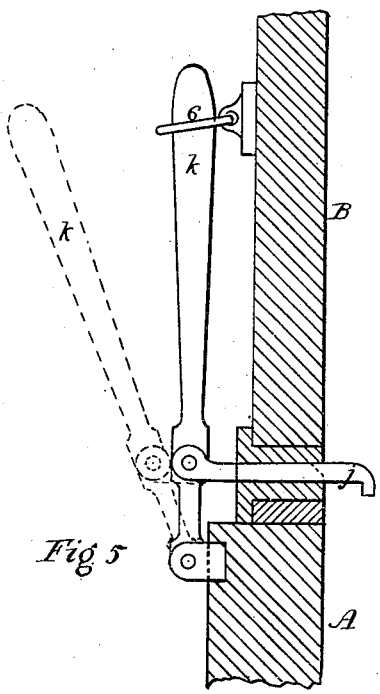

The inner ends of the wings, when closed, rest upon a bolt, $j$, withdrawable from the outside by lever $k$. (Shown in a sectional view at Fig. 5.) The lever k may be provided with a link or guard, 6, as shown, and may be arranged in a horizontal instead of a vertical position.

l are chains, arranged so that a crow-bar or lever, having the plate m as a fulcrum, may be employed for opening or starting the wings when more power is required for that purpose than is available from the handles g.

Instead of having fixed handles g, as shown, a detached bar may be employed, arranged to enter a perforated boss or enlargement formed upon the extremities of the shafts d.

Several other methods of opening and closing the wings may evidently be applied—as, for instance, a worm-wheel may be fitted to the end of each shaft, and worms actuated from the end of the wagon may be caused to rotate them.

A chain affixed to each end of the wing may also be operated from a shaft or winch below; but I prefer to employ handles, as shown and described, as being a simple arrangement, the use of which is at once apparent. The outer ends of the wings rest upon the cross-pieces or sills n, blocks o being also provided, upon which the wings may rest.

My invention is shown in the drawings as applied to a wagon having a middle longitudinal, D—that is to say, a central piece of timber running lengthwise of the wagon. The wings a are therefore constructed with openings to permit of their being moved downward.

Hinged metal covers or sleeves q, arranged as shown, are provided to prevent material entering the orifice made between the wings and middle longitudinal during the operation of opening.

It will be evident that my invention is equally applicable to wagons having the center-piece running crosswise, in which case a separate bolt to each wing might be provided, or a double-forked bolt working at each side of the center-piece might be operated by a single lever. With the center-piece running crosswise of the wagon, it will obviously be unnecessary to make a slit or long opening in the wings, as required when the center-piece runs lengthwise. The upper edge of the center-pieces is preferably chamfered, as shown, to prevent the lodging of material thereupon.

The outer ends of the wings may be provided with sides or backs, or both; or the ends and sides of the wagon itself may be made to move with the floor on a pivot, as above described, if desirable. In some cases it may be convenient to arrange the wings or sections so that when in the closed position their edges shall overlap one another.

The improved wagon having its floor constructed as above described is available for carrying other cargo than coals or minerals equally with ordinary freight wagons or trucks, and may, moreover, be constructed at small cost as compared with other forms of freight-wagons which discharge their contents at the bottom.

I claim as my invention—

1. A freight car or wagon having its floor divided longitudinally by a rigid girt, and composed of a series of valves arranged to be tilted toward each other, as set forth, means, substantially as specified, to support the free ends of the valves against vertical movement, and means, substantially as set forth, to tilt said sections, whereby the load is dumped at a point midway, or nearly so, between the wheel-axles, all combined and operating substantially as described.

2. A freight-car having its floor divided longitudinally by a rigid girder, and in combination therewith the pivoted valves, arranged as set forth, and the hinged protecting-plates q, operating together substantially as described, and for the purpose specified.

3. In a freight-car, the combination, with the pivoted valve-sections a, of the stops o and E, preferably covered with rubber, for the purpose set forth—the former to limit their downward motion and maintain their horizontality at one end, and the latter to limit their downward motion when tilted to discharge a load—and the bolt j and lever k, to maintain the horizontality of the opposite end of said sections and lock them in position, and adapted to release said sections, as and for the purpose specified.

4. The combination of the pivoted floor a, the chain or hook l, and the plate m, for the purposes described.

5. In a freight-car, the combination, with the pivoted floor-sections a and their shafts, of the movable stops j k, the stops o, and an operating-lever for said shafts, and means, substantially as shown and described, for locking said levers against accidental displacement, substantially as and for the purpose specified.

6. In a freight-car having its floor composed of a series of pivoted valves, and in combination therewith and their shafts and operating-levers, arranged substantially as described, means, substantially as specified, to assist the downward movement of said valves when being tilted independently of the operating-levers, substantially as and for the purpose specified.

T. R. HUTTON.

Witnesses:
H. SARENCIÉRES PEARSON,
RICHARD RELPH.